United States Patent

[11] 3,612,236

[72] Inventors: Gustaf Harry Fernstrom
Klinten;
Karl Ake Moberg, Tyreso, both of Sweden
[21] Appl. No.: 48,083
[22] Filed: June 22, 1970
[45] Patented: Oct. 12, 1971
[73] Assignee: Atlas Copco Aktiebolag
Nacka, Sweden
[32] Priority: June 27, 1969
[33] Sweden
[31] 9186/69

[54] THREADED FASTENER-SETTING TOOL WITH TORQUE RELEASE MEANS
9 Claims, 7 Drawing Figs.
[52] U.S. Cl. .................................................. 192/56 R,
81/52.4, 91/59, 192/150
[51] Int. Cl. .............................................. F16d 43/20
[50] Field of Search .......................................... 192/56 R,
150, .034; 81/52.4; 91/59; 173/12

[56] References Cited
UNITED STATES PATENTS
| | | | |
|---|---|---|---|
| 2,778,468 | 1/1957 | Babaian | 192/56 |
| 2,881,888 | 4/1959 | Amtsberg | 192/56 |
| 3,059,620 | 10/1962 | Eckman | 173/12 X |
| 3,477,521 | 11/1969 | Kiester et al. | 91/59 X |

Primary Examiner—Allan D. Herrmann
Attorney—Bauer and Goodman

ABSTRACT: In the housing of a threaded fastener-setting tool with predetermined torque release, a motor rotates a driving clutch part and a rotatable tool spindle carrying a driven clutch part is movable in the housing from advanced to retracted position therein to bring the driving and driven clutch parts together into engagement for rotation of the tool spindle. During such engaging movement a separating spring is compressed between the clutch parts. At torque release the separating spring moves one of the clutch parts axially relative to the other and to the tool spindle to disengage the clutch parts while the tool spindle remains retracted. A bolt keeps normally said one clutch part poised therebetween and between said separating spring but is displaced by a torque responsive coupling to release disengagement.

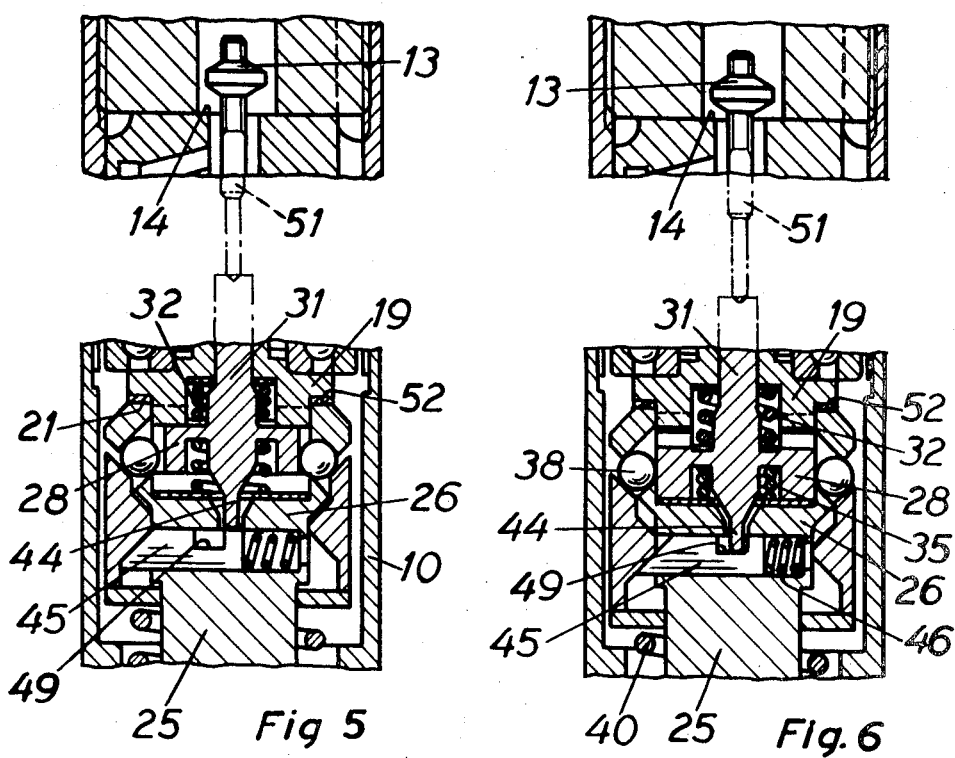
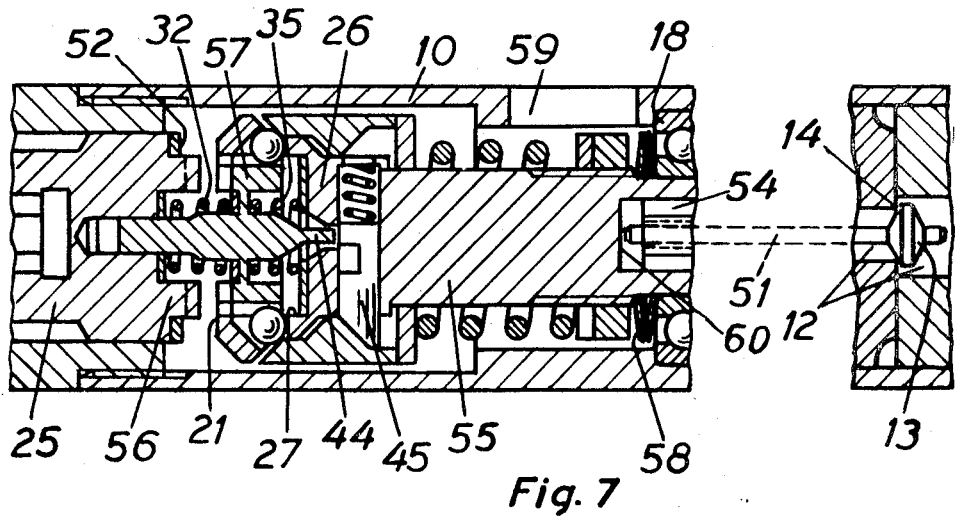

THREADED FASTENER-SETTING TOOL WITH TORQUE RELEASE MEANS

The invention relates to a threaded fastener-setting tool with torque release means in the power transmission between a motor in the tool and a tool spindle rotatably driven thereby via a driving and a driven clutch part. In a known-type of such fastener-setting tools a tool spindle on the one hand is axially movably arranged in the tool between an advanced and a retracted position relative thereto, and on the other carries the driven clutch part which in the retracted position of the tool spindle rotates the spindle by axial engagement with the driving clutch part with the tool spindle overcoming a separating spring acting therebetween and between the transmission. In this tool the torque release means is activated as soon as the tool spindle meets a turning resistance corresponding to a torque value preset in the torque release means, at which instant the clutch parts are disengaged while the tool spindle remains in the retracted position thereof.

The automatic torque surveillance for threaded fastener-setting tools of this type has, particularly in connection with the locking and release of the automatically controlled clutch parts, resulted in complicated constructions with a multitude of details which in order to give dependable function and small deviation become expensive in production. It is a primary object of the invention to simplify the automatic means in order to bring down the number of details involved in the clutch part control. Another object of the invention is to simplify the mounting of the separation spring and to use it as a driving power for the release while applied directly against the clutch parts.

For the above and other purposes there is according to the invention provided a threaded fastener-setting tool with torque release means comprising a tool housing, a rotation motor in said tool housing, a power transmission in said tool housing rotatably connected to said motor, cooperating rotatable driving and driven clutch parts in said power transmission, a tool spindle carrying said driven clutch part and carried axially movably and rotatably in said tool housing between an advanced and a retracted position relative thereto for respectively disengaging or interengaging said clutch parts, a separating spring interposed between said clutch parts and expanded or compressed therebetween in respectively advanced or retracted position of said tool spindle, means supporting one of said clutch parts axially movably relative to said tool spindle, a bolt movably mounted between a position in abutting relation to said movable clutch part for keeping said movable clutch part poised between said separating spring and said bolt and a release position, and torque release means in operative engagement with said bolt for moving it to said release position to cause disengaging movement of said movable clutch part by expansion of said separating spring relative to said tool spindle in the retracted position of the latter.

The above and other purposes of the invention will become obvious from the following description and from the accompanying drawings in which two embodiments of the invention are illustrated by way of example. It should be understood that these embodiments are only illustrative of the invention and that various modifications thereof may be made within the scope of the appended claims. In the drawings:

FIG. 5 shows two fragmentary sections of FIG. 1, one of the torque release means with the clutch parts in interengaged position and the tool spindle in retracted position and the other with the compressed air supply valve of the screw-setting tool in open position.

FIG. 6 shows the fragmentary sections in FIG. 5 when the torque release means is activated, the clutch parts are disengaged, the tool spindle remains in retracted position, and the supply valve is in open position.

FIG. 7, finally, shows a modified embodiment in which the torque release means is associated with the driving clutch part.

Figure 2:
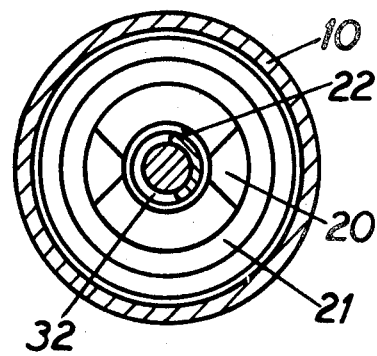
FIG. 2 is a cross section seen on the line 2—2 in FIG. 1.
Figure 3:
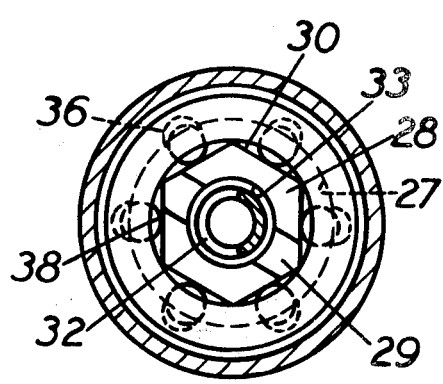
FIG. 3 is a cross section seen on the line 3—3 in FIG. 1.
Figure 4:
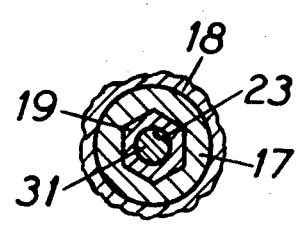
FIG. 4 is a fragmentary cross section seen on the line 4—4 in FIG. 1.

In the housing 10 of the threaded fastener-setting tool there is carried a motor 11 which is driven by electric power or, as shown, by pressure fluid. As an example for description has been chosen a pressure fluid-actuated motor 11 driven by compressed air supplied to the motor 11 via a passage 12. In the passage 12 is arranged a supply valve 13 adapted for cooperation with a seat 14. The motor 11 rotates via a spline shaft 15 a planetary transmission package 16, the output shaft of which is provided by an internally hexagonal sleeve 17 journaled in a ball bearing 18. The ball bearing 18 supports the driving clutch part 19 which projects nonrotatably into the hexagonal sleeve 17 and is driven thereby. The driving clutch part 19 has axial claws 20 and an axially directed sliding surface 21 which in ring shape surrounds the claws 20 and for example is formed by a bronze ring. An axial bottom hole 22, FIG. 2, is provided centrally in the clutch part 19 and a bore 23 extends axially therefrom through the clutch part 19.

A conventional tool spindle 25 for receiving a screw driver or socket wrench, not shown, is arranged in the forward end of the threaded fastener-setting tool. The tool spindle 25 in the embodiment shown in FIGS. 1–6 provides part of a clutch housing 26 for the torque release means of the tool. The clutch housing 26 has an axial cylindrical socket 27 the mouth of which is surrounded by an axially facing sliding surface 52 and in which a driven or movable clutch part 28 is carried axially movably. The movable clutch part 28 is provided with axial claws 29, has a polygonal, for example hexagonal, outer portion 30 and is by a central spindle 31 rotatably and slidably guided in the bore 23 of the driving clutch part 19. A separating spring 32 is inserted around the spindle 31 between the bottom hole 22 of the driving clutch part 19 and a ring groove 33 in the movable clutch part 28. The movable clutch part 28 is actuated by a zero-setting spring 35 bearing thereagainst and against the bottom of the socket 27 which spring strives to move the clutch part 28 to the mouth of the socket 27, FIG. 1.

The socket 27 forms part of a radial ball coupling for sensing of the torque transmitted via the movable clutch part 28 to the tool spindle 25. To this end there are arranged in the clutch housing 26 bores 36 which are directed axially obliquely relative to the socket 27. A sleeve 37 slidable on the clutch housing 26 pushes by its forward cam end applied against the radially outer portions of the balls 38 said balls 38 inward through the bores 36 against the hexagonal sides 30 of the movable clutch part 28. The sleeve 37 in its turn is pushed by a washer 39 and a helical loading spring 40 against the balls 38. The spring tension of the loading spring 40 is preadjustable by means of a setting nut 41 threaded onto the tool spindle 25 which nut 41 bears against the loading spring 40 through the intermediary of a journaling washer 42 of bronze. The journaling washer 42 is slidable axially within and rotatable relative to the housing 10 of the tool and is axially slidable but nonrotatably fixed to the tool spindle 25.

The zero-setting spring 35 of the movable clutch part 28 surrounds a pointed portion or point 44 projecting axially from the clutch part 28 into the clutch housing 26. A bolt 45 slidably guided in the housing 26 transversely or radially thereof provides a support for the point 44, FIG. 1, 2, keeping the movable clutch part 28 poised at the mouth of the socket 27. A snap spring 46 strives to project the bolt 45 radially outward so that an oblique cam surface 47 on the bolt 45 is urged into abutting relation against an oblique cam shoulder 48 in the sleeve 37. Through radial depression of the bolt 45 a peripheral recess 49 thereon can be aligned with the point 44 to cause the latter to fall axially into the recess 49 so that the movable clutch part 28 is displaced inward towards the bottom of the socket 27.

Figure 1:
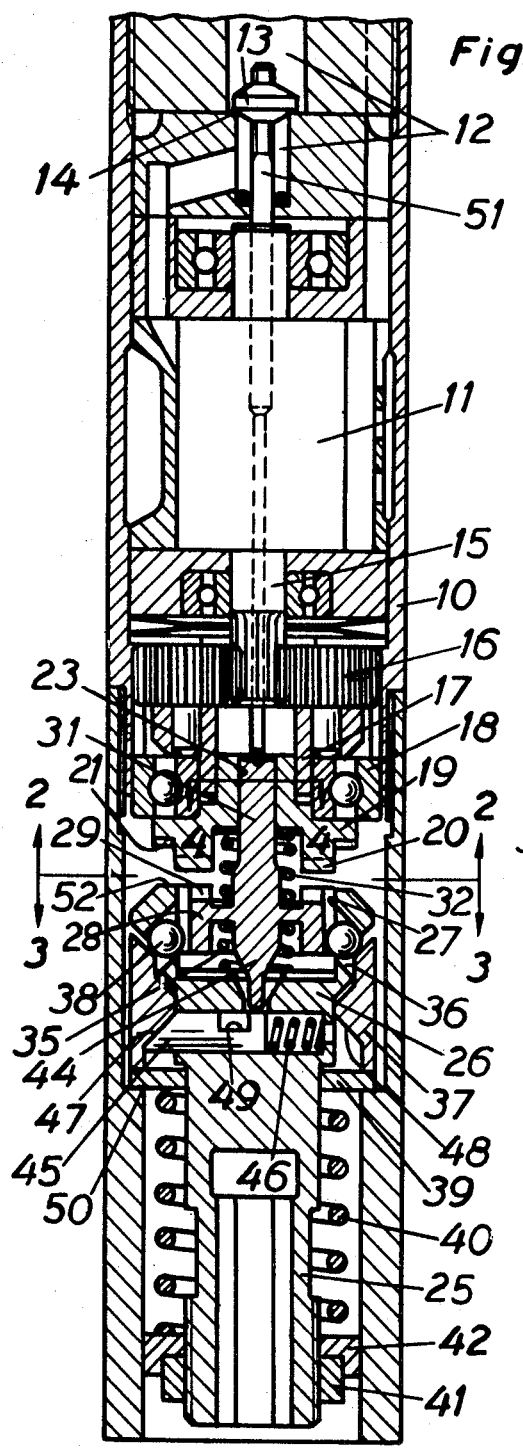
FIG. 1 shows a longitudinal section through a threaded fastener-setting tool according to the invention. The torque release means is shown associated with the driven clutch part.

When the clutch parts 19, 28 are disengaged and the tool spindle 25 is disposed in a projected position in the housing 10 of the tool, FIG. 1, the clutch housing 26 is supported through the intermediary of the sleeve 37 and the washer 39 against an inner shoulder 50 in the housing 10. In this position the movable clutch part 28 takes support at the point 44 thereof against the bolt 45. The separating spring 32 is expanded relative to the driving clutch part 19 and the movable clutch part 28 is kept at the mouth of the socket 27 by the zero-setting spring 35. In this position a valve-actuating means or stem 51 extends from the supply valve 13 to the inner end of spindle 31 of the movable clutch part 28 such that the supply valve 13 is kept closed on the seat 14 thereof by the air pressure in the passage 12 upstream of the seat 14. The parts of the screw-setting tool 10 are disposed in the above related position, FIG. 1, in inactivated starting position.

When the tool spindle 25 is pressed into the housing 10 of the threaded fastener-setting tool by the latter being moved towards a work piece and by the screw driver, not shown, engaging the screw which is supported by the work piece, the clutch housing 26 is displaced towards the driving clutch part 19 until the sliding surface 52 thereof abuts against the sliding surface 21 of the driving clutch part 19, FIG. 5. Since the movable clutch part 28 is blocked at the point 44 by the bolt 45 the movable clutch part is also moved upward towards the driving clutch part 19 under compression of the separating spring 32 between the clutch parts 19, 28. Thus the clutch claws 20, 29 engage one another. Simultaneously the spindle 31 of the driven clutch part 28 displaces the valve stem 51 axially rearwardly in the housing 10 of the tool lifting the supply valve 13 off its seat 14 whereby compressed air is supplied to the motor 11. As a result the motor 11 is started, rotating via the planetary transmission package 16 the driving clutch part 19 and via the latter the movable clutch part 28, the driving torque being transmitted via the balls 38 of the radial ball coupling to the clutch housing 26 and to the tool spindle 25. During rotation the clutch housing 26 is centered in the housing 10 of the screw-setting tool by the spindle 31, the hexagonal surfaces 30, the balls 36, the sleeve 37 and the journaling washer 42.

As soon as the tool spindle 25 during screwing meets such large a resistance that the compressing force preset in the loading spring 40 against the sleeve 37 is overcome by the hexagonal surfaces 30 of the clutch part 28 displacing the balls 38 radially outward and backward into the oblique bores 36 and moving the sleeve 37 rearwardly against the action of the loading spring 40, the cam shoulder 48 of the sleeve 37 will push the bolt 48 radially inwardly so that the recess 49 thereof takes alignment with the point 44 of the movable clutch part 28. Through actuation of the separating spring 32 clamped between the clutch parts 19, 28, which spring in compressed state is stronger than the zero-setting spring 35, the movable clutch part 28 is then pushed axially into the socket 27 towards the bottom thereof, the point 44 abutting against the bottom surface of the recess 49, FIG. 6. As a result thereof the supply valve 13 is lowered somewhat in the direction of its seat but does not close the air supply to the motor 11. The driving clutch part 28 thus continues to rotate sliding against the clutch housing 26 at the sliding surface 21 simultaneously with the expanded separating spring 32 sliding against the bottoms of the bottom hole 22 and the ring groove 33 which for purposes of reducing the friction may be provided with suitable sliding washers for example of bronze. The tool spindle 25 remains stationary in the retracted position until the operator lifts the tool housing 10 off the driven screw. At lifting-off the separating spring 32 expands further, FIG. 1, by reason of which the zero-setting spring 35 can push away the movable clutch part 28 to the mouth of the socket 27, at which instant the point 44 leaves the recess 49 and is blocked by the bolt 45 which by the snap spring 46 is returned radially outwardly into abutting relation against the sleeve 37. Simultaneously therewith the supply valve 13 sinks onto the seat 14 so that the supply of compressed air to the motor 11 is interrupted and the motor stops.

As an alternative the point 44 and the opening or recess 49 may be dimensioned such that the supply valve 13 closes onto its seat 14 already when the torque release means is activated and the bolt 45 is displaced to enable the recess 49 to take alignment with the point 44. In such a design the claws 20, 29 are made so long that they are in permanent engagement with one another. The sudden stop at release usually causes that the motor 11 via the transmission package 16 and the claws 20, 29 locks all the parts in the power transmission under a remaining driving torque load. For purposes of lifting off the screw-setting tool 10 the operator therefore must perform manually a turning movement in for example counter-clockwise direction for releasing the parts from load which in assembly line work can cause rapid tiring.

In the embodiment of FIG. 7 the torque release means is associated with the driving clutch part instead of with the driven. Consequently the clutch housing 26 of the torque release means is in engagement with the output end of the planetary transmission package via a spindle 55 which output end has been given the shape of a hexagon 54. The loading spring 40 is arranged around the spindle 55. The tool spindle 25 is made in one piece with the driven clutch part 56 while the driving or movable clutch part 57 is controlled by the automatic means of the torque release means, such control is performed in full analogy with the torque release in the embodiment shown in FIGS. 1-6. In the activated position of the torque release means the movable clutch part 57 through expansion of the separating spring 32 relative to the driven clutch part 56 falls into the socket 27 of the housing 26 so that the torque transmission to the tool head 25 is interrupted. The spindle 55 rests against the bearing 18 via a pair of relatively weak Belleville springs 58 which are compressed as soon as the separating spring 32 starts to be compressed during movement of the tool spindle 25 towards retracted position at which instant the spindle 55 is pushed into the screw-setting tool 10. This pushing is used for actuating the valve stem 51 by an inner surface 60 in the spindle 55 so that the supply valve 13 is raised from the seat 14 when the clutch parts 56, 57 mesh. At release the valve 13 remains open until the screw driver 10 is lifted off the screw and the work piece. In other respects the embodiment of FIG. 7 operates in full analogy with the corresponding parts of the embodiment shown in FIGS. 1-6. Followingly further description is deemed unnecessary. The tension of the loading spring 40 is adjusted through suitable holes 59 in the tool housing 10 or through disassembly of the housing 10 at a suitable dividing joint.

We claim:

1. A threaded fastener-setting tool with torque release means comprising a tool housing, a rotation motor in said tool housing, a power transmission in said tool housing rotatably connected to said motor, cooperating rotatable driving and driven clutch parts in said power transmission, a tool spindle carrying said driven clutch part and carried axially movably and rotatably in said tool housing between an advanced and a retracted position relative thereto for respectively disengaging or interengaging said clutch parts, a separating spring interposed between said clutch parts and expanded or compressed therebetween in respectively advanced or retracted position of said tool spindle, means supporting one of said clutch parts axially movably relative to said tool spindle, a bolt movably mounted between a position in abutting relation to said movable clutch part for keeping said movable clutch part poised between said separating spring and said bolt and a release position, and torque release means in operative engagement with said bolt for moving it to said release position to cause disengaging movement of said movable clutch part by expansion of said separating spring relative to said tool spindle in the retracted position of the latter.

2. A threaded fastener-setting tool according to claim 1 in which said torque release means includes a clutch housing, an axial socket in said clutch housing receiving said movable clutch part axially movably and depressably into said socket, and a zero-setting spring between said socket and movable clutch part, said zero-setting spring being weaker than said separating spring.

3. A threaded fastener-setting tool according to claim 2 in which said bolt is journaled transversely movably within said clutch housing inwardly of said socket and said movable clutch part has a point thereon coaxial with said tool spindle and abutting against said bolt in the abutting position thereof.

4. A threaded fastener-setting tool according to claim 3 in which said bolt has an opening thereon alignable with said point in the release position of said bolt, a snap spring in said clutch housing for urging said bolt radially outwardly in said clutch housing and said opening out of alignment with said point, and cam means at the outer end of said bolt for the displacement thereof radially inward and alignment of said opening with said point.

5. A threaded fastener-setting tool according to claim 2 in which said movable clutch part has a polygonal outer portion, apertures in said clutch housing around said socket thereof, balls in said apertures each engaging with the radially inward portion thereof one of the sides of said polygonal portion, a sleeve slidable on said clutch housing in camming engagement with the radially outward portions of said balls, a loading spring for biasing said sleeve against said balls and said balls against said sides, and cooperating cam means on said sleeve and said bolt for moving the latter to said release position thereof.

6. A threaded fastener-setting tool according to claim 1 in which said motor is a pressure fluid-actuated motor, a passage for conveying pressure fluid to said motor, a valve movable between open and closed position in said passage for controlling said motor, actuating means extending between said movable clutch part and said valve for moving said valve from closed to open position when said tool spindle is moved from the advanced to the retracted position thereof, and an abutment surface on said bolt defining a disengaging position for said movable clutch part in which disengaging position said actuating means maintains said valve in the open position thereof.

7. A threaded fastener-setting tool according to claim 1 in which said movable clutch part has a central spindle thereon rotatably and axially slidably guided in said other clutch part and surrounded by said separating spring.

8. A threaded fastener-setting tool according to claim 7 in which there are provided cooperating axially facing sliding surfaces circumferentially on said clutch housing and said other clutch part for defining said retracted position of said tool spindle and permitting relative rotation therein between said other clutch part and clutch housing.

9. A threaded fastener-setting tool according to claim 2 in which said tool spindle is connected to said clutch housing.